United States Patent [19]

Bradley

[11] 4,403,627

[45] Sep. 13, 1983

[54] BUFFER VALVE

[76] Inventor: Gerald R. Bradley, Rte. 1, Box 484A, Red Oak, Tex. 75154

[21] Appl. No.: 171,119

[22] Filed: Jul. 22, 1980

[51] Int. Cl.³ .................. F16K 17/12; F16K 31/12
[52] U.S. Cl. ................................ 137/508; 137/115; 137/538; 251/63
[58] Field of Search ............ 137/115, 219, 220, 508, 137/538; 251/63, 343

[56] References Cited

U.S. PATENT DOCUMENTS

| | | | |
|---|---|---|---|
| 2,655,173 | 10/1953 | Overbeke | 137/538 X |
| 3,423,023 | 1/1969 | Fortier | 137/508 X |
| 3,782,410 | 1/1974 | Steuby | 137/508 X |
| 4,128,209 | 12/1978 | Johnson | 251/343 X |

FOREIGN PATENT DOCUMENTS 974852  9/1975  Canada ............................. 137/508

Primary Examiner—Robert G. Nilson
Attorney, Agent, or Firm—H. Mathews Garland

[57] ABSTRACT

A buffer valve or compensator for use in a margarine mold system to permit continuous operation of a positive discharge pump in the system, such valve including a valve housing connected to a conduit section for a flow line on the discharge side of the pump, a central discharge tube in the housing, a blind bore in the discharge tube terminating at the inward end of the tube, lateral discharge ports in the discharge tube into the bore at the inward end thereof, an annular piston in the housing around the discharge tube movable between a first inward end position covering the discharge ports and a second outward end position uncovering the discharge ports, a stop member limiting the outward movement of the annular piston, and ports in the closed outward end of the housing for introducing air under pressure to bias the piston toward the inward end position. The buffer valve is connected between the positive displacement pump, a chiller, and the mold machine. A margarine recirculating line runs from the discharge tube of the valve through a remelt tank back to a storage tank connected with the pump. An air supply is connected with the housing air ports. The air system includes an exhaust valve which opens when the air supply is shut off allowing the buffer valve to open to recirculate margarine when the mold machine is cycling from finishing filling one mold to starting filling the next mold.

10 Claims, 5 Drawing Figures

BUFFER VALVE

This invention relates to valves and more specifically relates to buffer valves or compensators for use in margarine molding systems.

Margarine is a manufactured butter substitute which is prepared in solid or semi-solid form for sale to consumers. Some margarine is sold in a readily spreadable semi-solid form in containers such as round plastic tubs. In other forms margarine is molded in quarter pound and one pound blocks which are substantially more solid and are wrapped in paper and generally packaged in a paperboard box. The manufacturing processes for each of the end product forms of margarine involve flowing the margarine as a liquid into a mold. The margarine is pumped in a semi-liquid form by a positive displacement pump from a storage container such as a tank through pipes into the mold. Using a positive discharge pump with a margarine mold device which must cycle as each molded product is formed and discharged, creates pressure surges in the fluid system which if not compensated for may produce air pockets and the like in the flowing margarine. To permit smooth constant operation of the positive displacement pump and mold device, valves have been employed in such systems which are variously called buffer, compensator, pop-off, and surge valves. One particular type of buffer valve which has been used in the past employs a cylindrical piston which reciprocates in a cylinder having a side discharge port. The cylinder is connected with the discharge line from the positive displacement pump so that pressure surges cause liquid margarine to displace the piston until some of the margarine is permitted to discharge through the side port returning to the pump. Such a buffer valve has two principal deficiencies. The side discharge tends to apply uneven pressures to the piston ultimately causing binding of the piston with the cylinder wall impairing the operation of the device. Also the side discharge tends to produce a channeling effect resulting in the development of stale pockets of margarine in the discharge cylinder. Both such deficiencies are remedied by the buffer valve of the present invention.

It is a particularly important object of the invention to provide a new and improved valve for use in a fluid flow system.

It is another particularly important object of the invention to provide a buffer valve or compensator for use in a liquid flow system employed in manufacturing molded margarine products.

It is another important object of the invention to provide a buffer valve for use with a positive displacement type pump in a margarine molding system.

It is another object of the invention to provide a buffer type valve which utilizes an annular cylinder to compensate for pressure surges and employs a central discharge for recirculating fluid.

It is another object of the invention to provide a buffer type valve utilizing an annular piston which does not bind as it reciprocates.

It is another object of the invention to provide a buffer type valve which utilizes a central discharge to minimize channeling which causes pockets of stale material in a margarine molding process.

In accordance with the invention there is provided a buffer valve which includes a cylindrical body adapted to open into a flow line, an annular piston movable in the body, a central discharge tube disposed through the piston and having a closed inward end, circumferentially spaced side discharge ports adjacent to the inward end, an open outward end, and air port means leading into the cylinder around the discharge tube for applying an air pressure to the outward end of the piston in the cylinder for biasing the piston to an inward end position. The buffer valve is preferably connected into a flanged conduit section having a spaced double wall providing a water jacket for hot water flow around margarine flowing in the line to prevent the margarine sticking to the inside wall of the line. The buffer valve and water jacketed conduit section are connectible into a liquid margarine line on the discharge side of a positive displacement pump downstream from a chiller in the line which starts crystallizing the fats in the margarine. The line leads to a margarine molding machine. Flow lines are also supplied from the discharge tube of the buffer valve to a remelt tank connected with the intake of the pump for recirculating margarine through the buffer valve to the pump. An air system is connected with the cylinder of the buffer valve for biasing the piston to the inward end position during flow of margarine to the mold. The annular piston is urged outwardly by the flowing margarine pressure and is biased inwardly by the air pressure reciprocating to a limited extent to compensate for pressure surges. The piston may move outwardly until the ports in the discharge tube are uncovered when a margarine mold is filled and permitting limited recirculation of liquid margarine back to the pump through the buffer valve.

The foregoing objects and advantages of the invention will be better understood from the following detailed description of a buffer valve embodying the features of the invention taken in conjunction with the accompanying drawings wherein.

Figure 1:
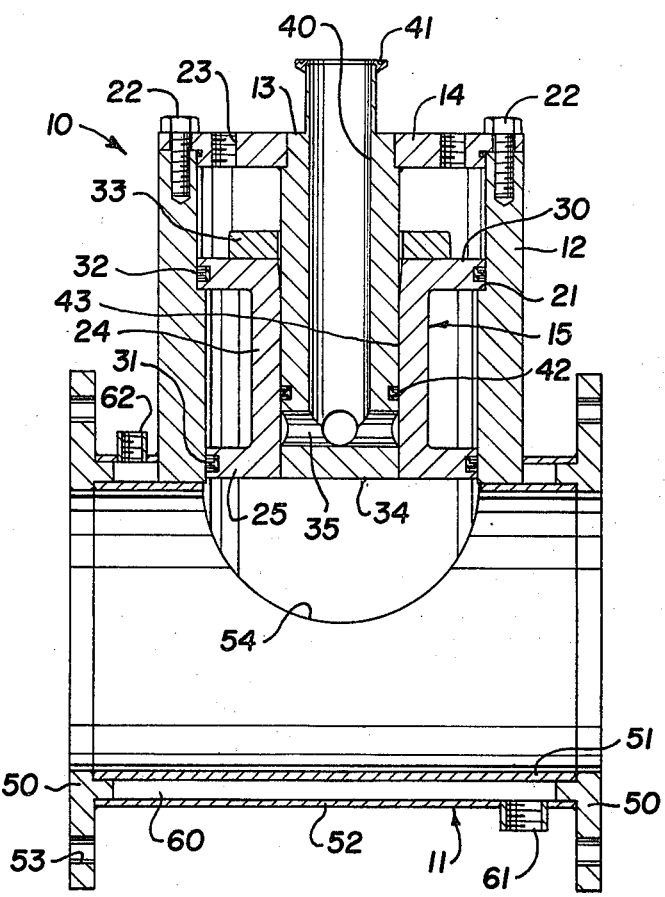
FIG. 1 is a side view in section of the buffer valve mounted on a water jacketed conduit section.
Figure 2:
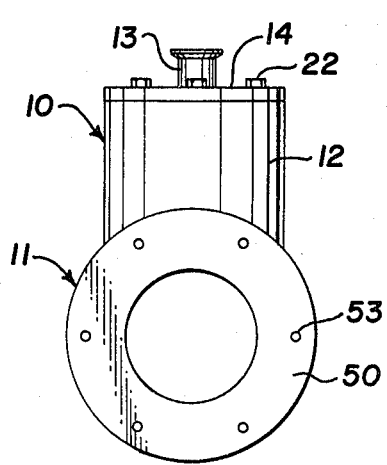
FIG. 2 is a reduced end view in elevation of the buffer valve assembly as shown in FIG. 1.
Figure 3:
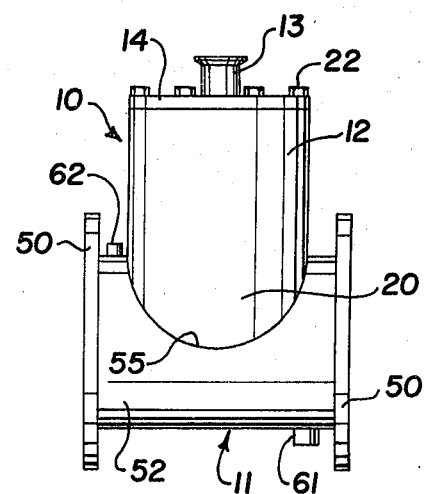
FIG. 3 is a reduced side view in elevation of the buffer valve assembly of FIG. 1.

Referring to FIG. 1, a buffer valve 10 connected with a conduit section 11 includes a cylinder body 12, a central discharge tube 13, a cylinder head 14, and an annular piston 15. The cylinder 12 has a scalloped lower end edge including opposite side skirt portions 20 designed to fit the cylindrical configuration of the conduit section 11 as evident in FIG. 3. The scalloped lower edge of the cylinder is secured with the inner wall of the conduit section 11 so that the cylinder opens into the bore through the conduit section. Internally the cylinder 12 has an annular outwardly facing stop shoulder 21 which serves to limit the inward movement of the piston 15. The outward end of the cylinder 12 is closed by the cylinder head 14 which is secured to the cylinder by bolts 22 which thread through the peripheral edge portions of the cylinder head into the wall of the cylinder. The cylinder head has a plurality of air ports 23 for admitting air to bias the piston inwardly.

The annular piston 15 is a spool-shaped member having a cylindrical body portion 24 and opposite end flanges 25 and 30 respectively. The inward end flange 25 is provided with an external annular seal 31 and slides along the inside wall of the cylinder inward of the stop flange 21. The outward end flange 30 is slightly larger than the inward end flange and carries an external annular seal 32 sliding along the inside wall of the cylinder 12 outward of the stop flange 21. The inside face of the flange 30 is engageable with the stop flange 21 at the inward end position of the piston 15 limiting the inward movement of the piston. An annular stop member 33 is loosely fitted around the discharge tube 13 on the top face of the piston 15 limiting the outward movement of the piston to an end position at which the end flange 30 of the piston is spaced inwardly from the inner face of the cylinder head 14 providing air space in the cylinder between the cylinder head and the piston in the flange.

The discharge tube 13 is rigidly secured through the cylinder head 14 at a position as shown in FIG. 1 at which the inward end 34 of the discharge tube is in alignment with the inward end of the piston 15 when the piston is at an inward end position against the stop shoulder 21. The discharge tube has a plurality of circumferentially spaced side ports 35 drilled into the tube at a location spaced from the inward end 34 of the tube. The ports 35 open into the blind bore 40 of the discharge tube which opens through the outward end 41 of the tube. An external annular seal 42 is carried by the discharge tube outward of the side ports 35 effecting a seal between the outer wall of the discharge tube and the inner wall defining the bore 43 through the piston. A sliding fit between the annular piston 15 and the outer wall of the discharge tube is provided to permit free movement of the piston along the discharge tube between opposite inward and outward end positions. At the outward end position of the piston the side ports 35 are uncovered communicating the bore 40 of the discharge tube through the side ports 35 with the bore through the conduit section 11.

The conduit section 11 is constructed integral with the buffer valve 10 providing mounting for the buffer valve and a section of conduit which is connected between the margarine pump and the mold machine. The conduit section 11 is a double walled device having identical opposite end flanges 50 secured into the opposite ends of concentric spaced inner and outer tubular walls 51 and 52, respectively. Each of the end flanges has circumferentially spaced bolt holes 53 for connection of the end flanges with adjacent flanges of connecting conduits. The inner wall 51 is provided with a top opening 54 which is sized and shaped to register with the bottom opening into the buffer valve cylinder 12 as evident in FIG. 1. The outer wall 52 similarly has a top and side opening 55 having substantially the same shape as the inner wall opening 54 and larger than such opening by approximately the thickness of the wall of the cylinder 12 so that the lower end portion of the cylinder 12 is disposed through the opening 55 with the bottom edge of the cylinder being secured to the outer wall surface of the inner wall 51 around the opening 54 in the inner wall. This preserves the fluid tight integrity of the spaced inner and outer walls around the valve cylinder while communicating the interior of the valve cylinder through the inner wall into the bore through the conduit section 11. The spaced concentric relationship of the inner and outer walls 51 and 52 defines an annular flow passage 60 between the walls for the flow of liquid such as water to maintain a desired temperature within the bore of the conduit section 11 to prevent sticking of the margarine flowing through the conduit section. The outer wall 52 has a water inlet half coupling 61 and a water outlet half coupling 62 along the bottom and top portions of the wall for flowing water through the annulus 60 of the conduit section.

Figure 5:
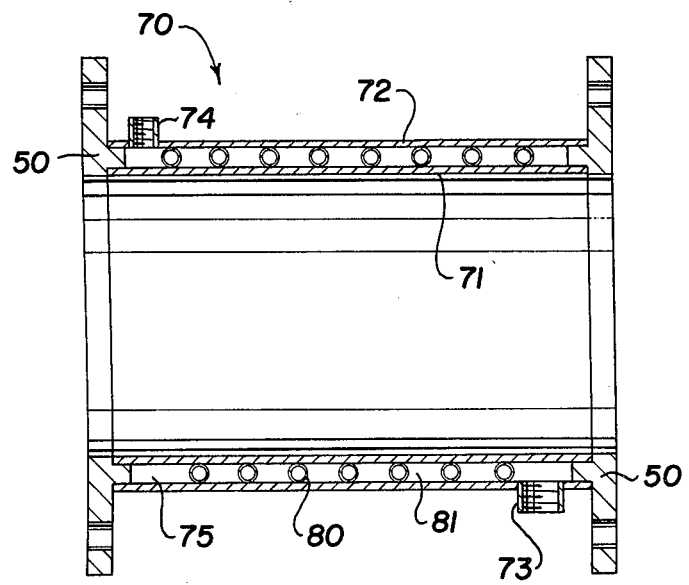
FIG. 5 is a side view in section of a water jacketed conduit section used in conjunction with the buffer valve in the system illustrated in FIG. 4.

FIG. 5 illustrates a jacketed conduit section 70 which includes opposite end flanges 50 connected into the opposite ends of concentric spaced inner and outer cylindrical walls 71 and 72, respectively. The outer wall 72 has a water inlet half coupling 73 along the bottom of the wall and a water outlet half coupling 74 along the top of the wall at the opposite end of the conduit section. The walls are spaced apart defining a cylindrical chamber 75 between the walls and the end flanges 50. A spiral section of tubing 80 is secured within the space 75 between the walls defining a spiral flow passage 81 in the space 75 between the walls running from the water inlet 73 to the water outlet 74 to maximize the flow of water between the walls preventing short circuiting of the water between the inlet and outlet. The conduit section 70 is designed to supplement the conduit section 11 thereby providing additional heating along the flow path of the liquid margarine from the pump to the mold machine.

Figure 4:
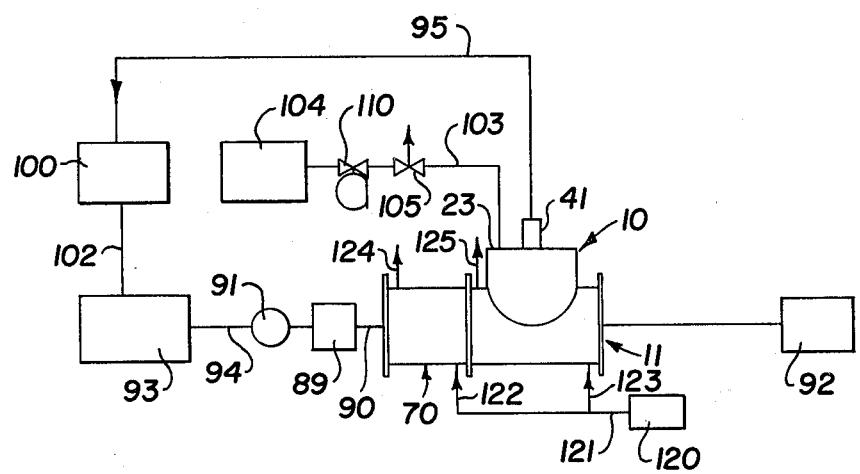
FIG. 4 is a schematic flow diagram of the buffer valve of the invention connected in a margarine molding system.

FIG. 4 schematically illustrates one system for molding margarine using the buffer valve of the invention. Referring to FIG. 4, the conduit section 11 which is integral with the buffer valve in the preferred form is connected in tandem with the conduit section 70 by securing adjacent end flanges 50 of the two conduit sections together. The conduit sections are then connected in a flow line 90 extending from a positive displacement pump 91 through a chiller 89 to a margarine mold machine 92. The pump, chiller, and mold machine are standard available units. A liquid margarine supply tank 93 is connected by a flow line 94 to the pump 91. A margarine recirculating line 95 runs from the end 41 of the discharge tube of the buffer valve 10 to a remelt tank 100 which is connected by a flow line 102 into the liquid margarine storage tank 93. The air ports 23 in the piston head 14 of the buffer valve are connected with an air line 103 extending to a source of air pressure 104. An exhaust valve 105 and a cam operated flow control valve 110 are included in the line 103 for controlling the supply of air to the piston 15 and for shutting off the flow to the cylinder and allowing exhaust to the atmosphere from the cylinder. Both the valves 105 and 110 are standard available valves. The exhaust valve 105 permits flow from the air source 104 through the line 103 to the buffer valve cylinder while precluding flow in the opposite direction and opening to the atmosphere to exhaust flow from the cylinder when the flow control valve 110 is closed. The valve 110 is a typical cam operated valve which is timed in sequence with the operation of the margarine mold machine 92. The valve 110 is timed to open when the mold machine starts to fill a margarine mold and to close when the mold fill cycle is complete.

To insure that the crystallizing margarine does not stick to the inside walls of the line 90 as it is pumped to the mold machine 92, both of the conduit sections 11 and 70 which comprise a part of the flow line 90 from the pump are heated by hot water flowing to the double walled conduit sections. A source of hot water 120 is connected with a supply line 121 leading to branch supply lines 122 and 123. The branch line 122 connects into the half coupling 73 of the conduit section 70 and the branch line 123 connects into the half coupling 61 of the conduit section 11. The hot water is exhausted from the conduit section 70 through a discharge line 124 connected with the half coupling 74 of the conduit section 70. Similarly a discharge line 125 is connected with the half coupling 62 of the conduit section 11 for flow of hot water from the conduit section. Both the discharge lines 124 and 125 lead to a suitable disposal such as a storage tank in which the water may be recirculated or directly into a sewage disposal drain. The water in the annular flow passage 60 of the conduit section 11 keeps the conduit at a desired temperature while similarly the water in the conduit section 70 flows in a spiral pattern from the coupling 73 to the coupling 74 along the path 81 defined by the spiral tubing section 80.

In accordance with the invention, the buffer valve 10 is operated in a system such as disclosed in FIG. 4 to continuously deliver margarine to the mold machine 92 by the positive displacement pump 91 allowing continuous operation of the pump without the presence of air or gas pockets in the molded product. Liquid margarine in a flowable state in the supply tank 93 is pumped through the line 90 by the positive displacement pump 91. Typically the flow line 90 may be a 6 inch pipe. A flow of hot water is established through the jacketed conduit sections 11 and 70 along the paths previously described to prevent sticking of the margarine as it passes along the buffer valve. Air pressure from the source 104 is maintained at a value to deliver air pressure to the ports 23 in the cylinder head 14 into the air chamber of the cylinder above the piston 15 at a value range of 35 to 80 psi within the cylinder. The cam operated valve 110 is normally closed. As the mold machine 92 starts a fill cycle the cam operated valve opens supplying air at the desired pressure from the source 104 through the line 103 including the exhaust valve 105 into the cylinder above the annular piston. The air pressure biases the annular cylinder downwardly toward the lower end position as stated in FIG. 1. Throughout the fill cycle the air pressure biases the annular piston toward the lower end position allowing some movement of the piston to compensate for pressure surges keeping a substantially constant pressure in the system while not permitting air or gas pockets to develop. When the mold in the mold machine 92 is filled the valve 110 closes shutting off the flow of air to the buffer valve cylinder through the line 103 which allows the exhaust valve 105 to open permitting the air in the cylinder 12 above the piston 15 to exhaust through the ports 23 along the line 103 and the exhaust valve 105 to the atmosphere. Since the mold is now filled and the positive discharge pump is still operating, the margarine discharged by the pump into the line 90 must be displaced from the line to allow continuous operation of the pump. The pressure in the margarine flow from the pump lifts the annular piston 15 moving the piston upwardly in the cylinder on the discharge tube 13 thereby providing space within the cylinder for displacement of the margarine which can no longer go into the mold. When the bottom face of the annular piston moves to a level at which the discharge ports 35 in the discharge tube are uncovered, the liquid margarine flows inwardly through the discharge ports 35 into the lower end of the bore 40 of the discharge tube and through the bore into the recirculating line 95. The margarine flows through the recirculating line to the remelt tank 100 where it is heated back to the desired liquid state for flow into the line 102 back into the supply tank 93. The recirculating of the liquid margarine continues while the mold is not being filled. Typically this involves the recirculation of only about 2% to 5% of the liquid margarine flowing in the system.

As soon as the mold begins to again fill the normally closed valve 110 is reopened by the cam operating the valve allowing air pressure to again be supplied into the cylinder 12 above the annular piston 15 of the buffer valve. The flow of the air through the exhaust valve 105 shifts the valve to close off the exhaust to the atmosphere allowing the air to flow in the line 103 into the buffer valve cylinder. The sequence of operation of the system including the buffer valve is repeated as the mold again refills.

During the operation of the buffer valve 10 the uniform and balanced flow of the margarine through the circumferentially spaced discharge ports 35 in the discharge tube 13 preclude the development of any pockets of margarine which may tend to become stale due to non-uniform return to the liquid state and mixing back in with the margarine being processed. Additionally, the uniformity of the application of the pressure from the margarine upwardly on the annular piston provides a balanced force on the piston which prevents binding of the piston during its upward and downward movement. The use of the stop member 33 on the top of the piston limits the movement of the piston upwardly to an upper end position at which there is ample air space between the piston and the cylinder head within the cylinder to allow free and even flow distribution of the air into the cylinder so that when the piston is returned downwardly no unbalanced forces develop.

Several modifications in the particular design of the buffer valve and related system will be apparent to those skilled in the art. For example the two separate water jacketed conduit sections 11 and 70 are illustrated while it will be understood that the length of the conduit section 11 could be increased and spiral tubing such as shown in the conduit section 70 could be installed in the conduit section 11 along opposite sides of the buffer valve housing providing the same heat from the circulating water as can be obtained from the two separate sections connected together. Additionally, it will be apparent that while the buffer valve 10 is illustrated as integral with the water jacketed conduit section 11, the buffer valve incorporating the features of the invention could utilize a cylinder housing 12 having an inward end threaded on a half coupling connected directly into a line such as the conduit 90. Thus, while the form of the buffer valve shown in FIG. 1 is preferred the configuration of the buffer valve housing cylinder 12 may be modified along its inward end to adapt the housing to a threaded connection with a half coupling or a T-connection leading to the margarine flow line.

What is claimed is:

1. A buffer valve for a fluid flow system comprising: a cylindrical valve housing having a first open end for communication with said fluid flow system and a second opposite closed end; a central discharge tube secured to said second end of said valve housing, said discharge tube and said valve housing having coincident longitudinal axes, said discharge tube and the inner wall of said valve housing defining an annular housing chamber, said discharge tube having a blind bore closed at a first inward end and having an opening along a second opposite end portion outward of said valve housing and lateral discharge ports along an inward end portion opening into said blind bore; an annular piston in said annular housing chamber around said discharge tube, said piston having an annular area facing said first open end of said housing and adapted to move between an inward end position covering said discharge ports in said discharge tube and an outward end position uncovering said discharge ports responsive to pressure in said fluid flow system admitted through said first open end; and means for biasing said annular piston toward said inward end position.

2. A buffer valve in accordance with claim 1 including seal means between the inner wall of said housing and said annular piston and seal means between the outer wall of said discharge tube and said annular piston.

3. A buffer valve in accordance with claim 2 including an internal annular stop shoulder in said housing engageable by said annular piston to limit the inward movement of said annular piston.

4. A buffer valve in accordance with claim 3 including stop means between an outward end of said annular piston and the second closed end of said housing to limit the outward movement of said piston to a position spaced from said closed end of said housing.

5. A buffer valve in accordance with claim 4 including means providing air ports in said closed end of said housing to admit air under pressure for biasing said annular piston toward said first inward end position.

6. A buffer valve in accordance with claim 5 wherein said air ports are in the closed head of said housing.

7. A buffer valve in accordance with claim 6 wherein said annular piston is a spool-shaped member having external annular opposite end flanges and said stop shoulder in said housing is engageable by the outward end flange on said piston.

8. A buffer valve in accordance with claim 1 including a tubular conduit section connectible in a flow line and connected along one side with said cylindrical housing communicating said piston inward of said piston with said conduit section.

9. A buffer valve in accordance with claim 8 wherein said conduit section comprises a pair of concentric spaced walls defining a fluid flow passage between said walls and inlet and outlet flow connections in the outer of said walls at spaced apart positions for fluid flow along said conduit section.

10. A buffer valve for use in a fluid flow system comprising: a conduit section having opposite end flanges for connection of said conduit section into a flow line of said fluid flow system and concentric spaced walls including inlet and outlet flow connections in the outer of said walls for flow of heat transfer fluids between said walls along said conduit section; a tubular valve housing connected at a first open end through a side of the walls of said conduit section, said inward open end of said valve housing opening through the inner wall of said conduit section into the bore through said section, said valve housing having a second closed outer end; central discharge tube secured through said closed outer end of said valve housing, the longitudinal axis of said discharge tube extending along the longitudinal axis of said valve housing, the inward end of said discharge tube being substantially aligned with the inward end of said valve housing, said discharge tube having a blind bore closed at the inward end thereof and open along the outward end portion outward of said closed end of said valve housing and said discharge tube having a plurality of circumferentially spaced lateral discharge ports along the inward end portion opening into said closed end of said blind bore; the outer wall of said discharge tube and the inner wall of said valve housing defining an annular cylinder chamber within said housing opening into said conduit section; an annular piston in said annular chamber of said housing movable between the first inward end position and a second outward end position, said piston being a spool-shaped member having opposite end external annular flanges; an external annular seal around said discharge tube outward of said lateral ports in said tube for sealing around said discharge tube with said annular piston; external annular seals around each of said end flanges on said annular piston sealing between said flanges and the inner walls of said valve housing; said annular piston covering said lateral ports in said discharge tube at said first inward end position and uncovering said ports at said second outward end position; means in said valve housing providing an internal annular stop shoulder engageable by said outward end flange of said annular piston limiting the inward movement of said annular piston in said housing; a stop member between the outward end of said annular piston and the closed end of said valve housing limiting the outward movement of said annular piston to said second outward end position spaced from said closed end of said valve housing; and means providing fluid ports in said closed end of said housing for supplying fluid under pressure into said housing to bias said annular piston toward said first end position.

* * * * *